(12) United States Patent
Li et al.

(10) Patent No.: US 12,278,389 B2
(45) Date of Patent: Apr. 15, 2025

(54) BATTERY RUPTURE VENT STRUCTURE AND METHOD FOR MANUFACTURING SAME, BATTERY COVER, AND BATTERY

(71) Applicant: SHENZHEN KEDALI INDUSTRY CO., LTD, Guangdong (CN)

(72) Inventors: Jianju Li, Guangdong (CN); Zhongtao Zhang, Guangdong (CN)

(73) Assignee: SHENZHEN KEDALI INDUSTRY CO., LTD, Guangdong (CN)

( * ) Notice: Subject to any disclaimer, the term of this patent is extended or adjusted under 35 U.S.C. 154(b) by 888 days.

(21) Appl. No.: 17/413,445

(22) PCT Filed: Mar. 28, 2019

(86) PCT No.: PCT/CN2019/079979
§ 371 (c)(1),
(2) Date: Jun. 11, 2021

(87) PCT Pub. No.: WO2020/118966
PCT Pub. Date: Jun. 18, 2020

(65) Prior Publication Data
US 2022/0059900 A1    Feb. 24, 2022

(30) Foreign Application Priority Data

Dec. 14, 2018   (CN) .......................... 201822104668.7

(51) Int. Cl.
*H01M 50/342*   (2021.01)
*H01M 50/147*   (2021.01)
(Continued)

(52) U.S. Cl.
CPC ..... *H01M 50/3425* (2021.01); *H01M 50/147* (2021.01); *H01M 50/148* (2021.01); *H01M 50/172* (2021.01); *H01M 50/562* (2021.01)

(58) Field of Classification Search
CPC ........... H01M 50/3425; H01M 50/147; H01M 50/148; H01M 50/172; H01M 50/562; H01M 50/30
See application file for complete search history.

(56) References Cited

U.S. PATENT DOCUMENTS

2011/0236734 A1*   9/2011   Ikeda ................ H01M 50/3425
137/511

FOREIGN PATENT DOCUMENTS

CN   102709503 A   * 10/2012
CN   205609636 U     9/2016
(Continued)

OTHER PUBLICATIONS

Office Action for corresponding Korean Application No. 10-2021-7019481 mailed Jul. 1, 2023.
(Continued)

*Primary Examiner* — Matthew T Martin
*Assistant Examiner* — Bartholomew A Hornsby
(74) *Attorney, Agent, or Firm* — Wood, Phillips, Katz, Clark & Mortimer

(57) ABSTRACT

Provided is a method for manufacturing a vent structure. The vent structure comprises a vent, and the method includes: providing a first notch without intersection on the surface of the vent with a first depth; and providing a second notch with a second depth on part of the first notch in the direction of the first depth.

12 Claims, 5 Drawing Sheets

(51) Int. Cl.
*H01M 50/148* (2021.01)
*H01M 50/172* (2021.01)
*H01M 50/562* (2021.01)

(56) References Cited

FOREIGN PATENT DOCUMENTS

| | | | | |
|---|---|---|---|---|
| CN | 207459042 U | | 6/2018 | |
| CN | 108565492 A | * | 9/2018 | ........ H01M 10/0525 |
| JP | 2010238558 A | | 10/2010 | |
| KR | 1020140109370 A | | 9/2014 | |

OTHER PUBLICATIONS

International Search Report for corresponding PCT Application No. PCT/CN2019/079979 mailed Sep. 19, 2019.

* cited by examiner

BATTERY RUPTURE VENT STRUCTURE AND METHOD FOR MANUFACTURING SAME, BATTERY COVER, AND BATTERY

CROSS-REFERENCE TO RELATED APPLICATION

This is a U.S. National Stage application, filed under 37 U.S.C. 371, of International Patent Application NO. PCT/CN2019/079979, filed on Mar. 28, 2019, which is based on and claims priority to Chinese patent application No. 201822104668. 7 filed on Dec. 14, 2018, the disclosure of which is incorporated herein by reference in its entirety.

TECHNICAL FIELD

The present disclosure relates to the technical field of batteries, for example, a battery vent structure and a method for manufacturing the same, a battery cover and a battery.

BACKGROUND

During the use of the power battery, due to short circuit or other reasons, the internal air pressure inside the battery may rise to exceed a safe value, resulting in hidden dangers such as explosions.

To minimize the hidden dangers, a vent is generally disposed on a battery cover, and a notch is disposed on the vent. The thickness of the vent at the notch is relatively thin. When the internal air pressure inside the battery exceeds a threshold value, the vent fractures from the notch and the gas is discharged in time to reduce the internal air pressure, thus avoiding explosions.

However, a notch trajectory of the vent in the related art may form intersections. Since the notch of the vent is usually formed directly by punch stamping, the puncher pin with the notch also has the intersection, resulting in that the structure of the puncher pin is more complex, and the intersection of the puncher pin is easy to be damaged. In addition, the intersection of the notch on the vent is prone to forming stress concentration to form stress concentration, which makes it difficult to control the threshold value of internal air pressure.

In addition, the notch in the related art is generally formed by direct stamping, which is likely to cause problems such as excessive depth in one single stamping and unstable stamping depth.

SUMMARY

The present disclosure provides a battery vent structure and a method for manufacturing the same, a battery cover and a battery, which can deepen the notch depth of the battery vent and enhance the stability of the threshold value of internal air pressure.

An embodiment provides a method for manufacturing a battery vent structure. The vent structure includes a vent. The method includes: providing a first notch without intersection on a surface of the vent at a first depth; and providing a second notch with a second depth on part of the first score in a direction of the first depth.

An embodiment provides a battery vent structure, which includes a vent. The battery vent structure is manufactured by the abovementioned method. The vent is configured to fracture from the second notch when the internal air pressure inside the battery exceeds a threshold value.

An embodiment provides a battery cover. The battery cover includes a cover body and the above mentioned battery vent structure disposed on the cover body. The battery vent is integrally punched or welded with the cover body.

An embodiment provides a battery. The battery includes the battery cover described above.

Figure 1:
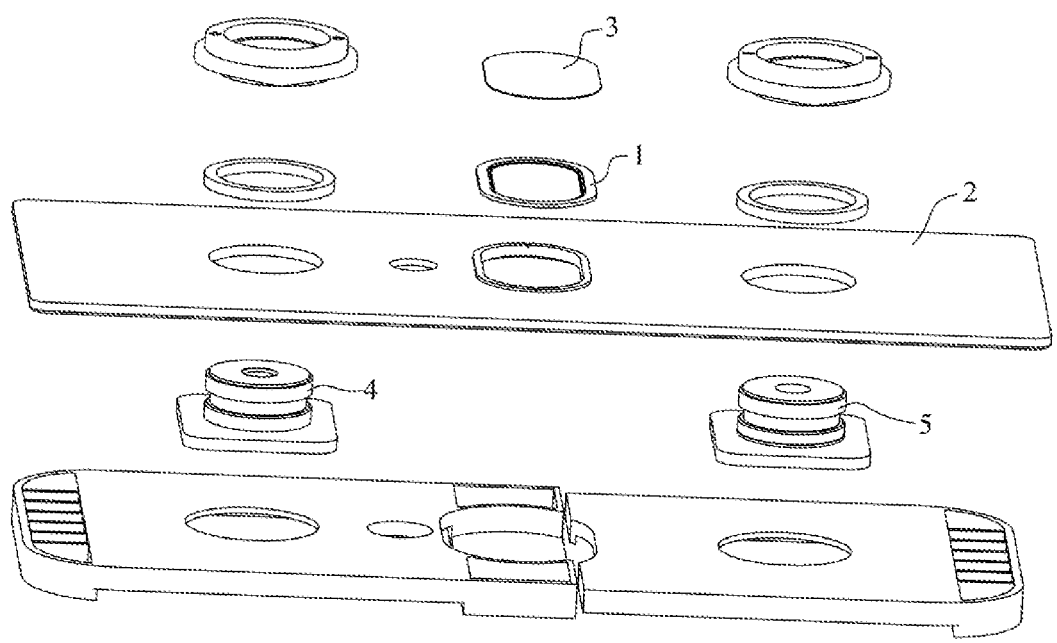
FIG. 1 is an exploded view of a battery provided by an embodiment.

| 1 | battery vent | 11 | first notch | 12 | second notch |
|---|---|---|---|---|---|
| h | first depth | | H | | second depth |
| 2 | cover body | | 3 | | vent protective film |
| 4 | positive terminal | | 5 | | negative terminal |

DETAILED DESCRIPTION

In the description of the present applicant, it is to be understood that the orientation or position relationships indicated by terms "above", "below", "front", "back", "left", "right", "vertical", "horizontal", "top", "bottom", "inside", "outside" and the like are based on the orientation or position relationships shown in the drawings, merely for facilitating description of the present application, and these relationships do not indicate or imply that the referred device or structural part must have a specific orientation and is constructed and operated in a specific orientation, and thus it shall not be construed as a restriction on this application.

As shown in FIG. 1, the embodiment provides a battery cover, which generally serves as a structural part on the top of a battery and forms a sealed cavity with a battery aluminum case. The battery cover includes a cover body 2. The cover body 2 forms the body structure of the battery cover.

Figure 2:
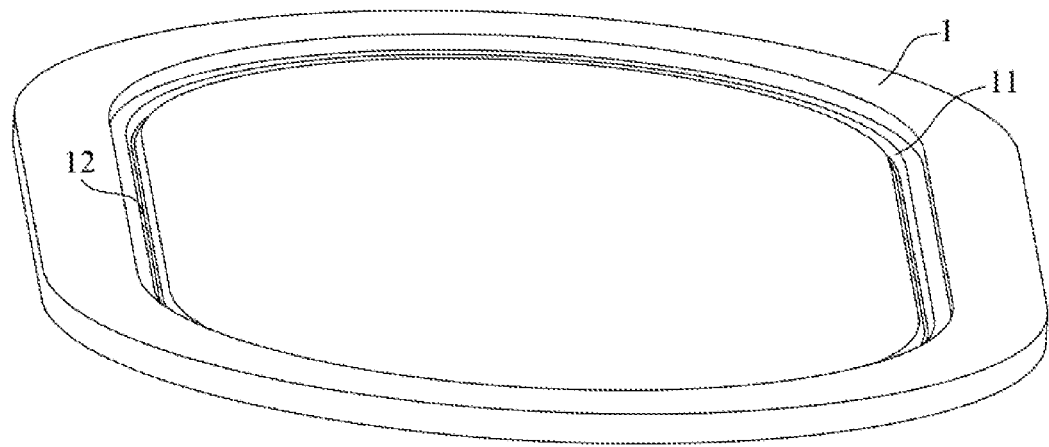
FIG. 2 is a structure view of a battery cover provided by an embodiment.

The battery vent structure shown in FIG. 2 is provided on the cover body 2, and the battery vent 1 may be integrally punched with or welded with the cover body 2. As shown in FIGS. 2 to 7, the battery vent structure includes a vent 1, and the surface of the vent 1 is provided with a notch. When the internal air pressure inside the battery exceeds a threshold value, the vent 1 fractures from the notch, ensuring that the gas inside the battery is discharged in time, thus avoiding the battery explosion. In the embodiment, the notch includes a first notch 11 and a second notch 12. The first notch 11 has no intersection and is disposed on the battery vent 1 at a first depth h. The second notch 12 deepens along the trajectory of a partial non-closed line of the first notch 11, that is, the second notch is disposed along a depth direction of the first notch, and is disposed on the battery vent 1 at a second depth H, where the second depth H is larger than the first depth h.

When the notch of the vent structure in this embodiment is processed, the first notch 11 is punched at first with a puncher pin, and then the second notch 12. Since the first notch 11 has no intersection, stress concentration does not occur on the notch, and the pressure threshold stability of notch fracture is relatively high. In addition, the puncher pin will not have a very sharp end at the intersection, which can reduce the wear of the puncher pin and facilitate the fabrication of the puncher pin. By sequentially processing the first notch 11 and the second notch 12, the accuracy of the notch depth can be improved and the instability of the notch depth in one processing can be avoided, so that the consistency of the notch depth of the vent 1 can be maintained and the stability of the threshold value of internal air pressure can be enhanced. In addition, the second notch 12 partially, but not completely, covers the first notch 11. Therefore, when the vent 1 fractures, the vent 1 will fracture along the second notch 12, and the part not covered by the second notch 12 can connect fractured and rolled fragments to the vent body, preventing the rolled fragments from falling to another area.

The embodiment further provides a method for manufacturing a vent structure. The battery vent structure includes a vent 1, and the method includes: providing a first notch 11 without intersection on the surface of the vent 1 with a first depth; and providing a second notch 12 having a second depth on part of the first notch 11 in the direction of the first depth. The method for manufacturing the vent is implemented by a punch.

In an embodiment, the first notch 11 is disposed on the vent 1 in a form of a closed line. The first notch 11, whose trajectory is a closed line, facilitates to keep the stress of the whole notch to be homogeneous at the first depth. The first notch 11 is racetrack-shaped, and the second notch 12 is located at an arc portion of the first notch 11 and a part of a straight-line portion of the first notch 11. Therefore, a part of the straight-line portion of the first notch 11 is left and thus not fully covered by the second notch 12. For such a notch, when the vent fractures, the straight-line portion of the first notch 11, which is not covered by the second notch 12, facilitates the rupture disc turning over, and also connect to the rolled vent fragments. In an embodiment, a shape of the first notch 11 may also be subject to other shapes, for example, when the first notch 11 is arc-shaped, the track length of the second notch 12 is ⅗ to ⅚ of the track length of the first notch 11.

In an embodiment, the height difference between the first notch 11 and the second notch 12 of the vent 1 may be 0.05 mm to 0.15 mm. When height difference falls under this range, the accuracy of the processing depth of the second notch 12 can be better ensured.

As shown in FIG. 1, in this embodiment, a vent protective film 3 is further equipped at the outer side of the vent 1. The vent protective film 3 can limit the position of the outer side of the vent 1, so the vent 1 can be prevented from being damaged by an external force or entry of chemical substances such as electrolyte during the battery production process.

The cover body 2 is also provided with a positive pole 4 and a negative terminal 5. The cover body 2 is a metal plate, the positive terminal 4 is conductively fixed to the cover body 2, and the negative terminal 5 is fixed to the cover body 2 and is insulated from the cover body 2. The negative terminal 5 is subject to copper-aluminum compound, the top of the copper-aluminum compound terminal is an aluminum material end, and the bottom of the copper-aluminum compound terminal is a copper material end. The compound terminal can be compatible with the characteristics of two kinds of materials, which is conducive to maintaining good electrical conductivity and connectivity.

Figure 3:
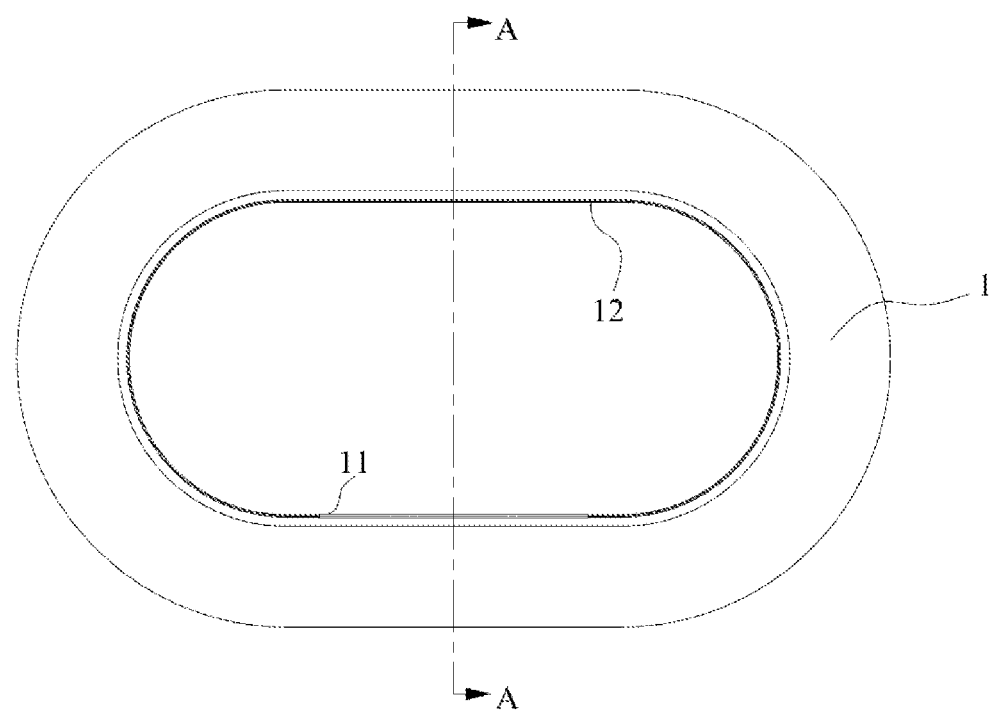
FIG. 3 is a front view of a battery cover provided by an embodiment.
Figure 4:
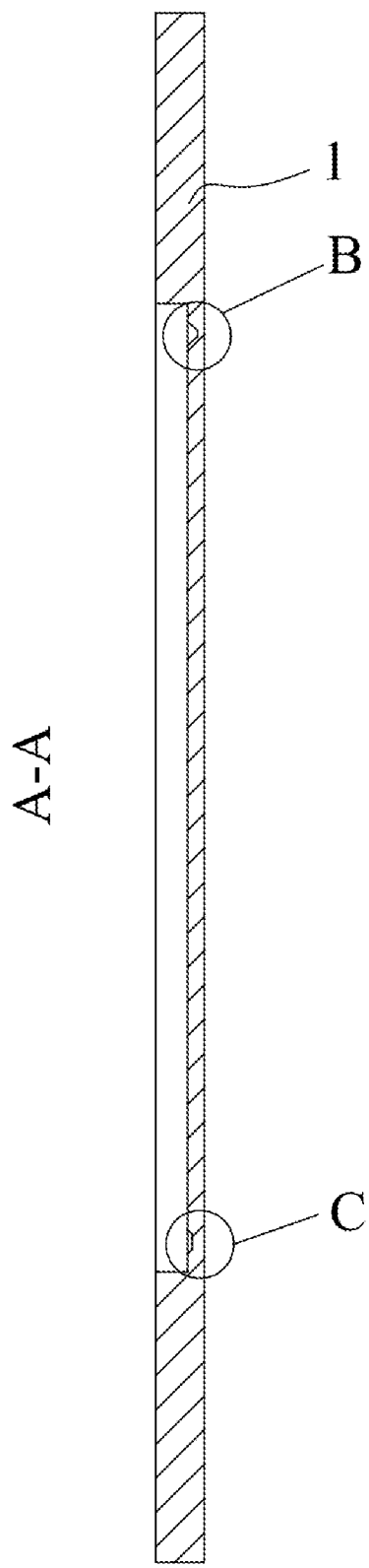
FIG. 4 is a sectional view of A-A of FIG. 3.
Figure 5:
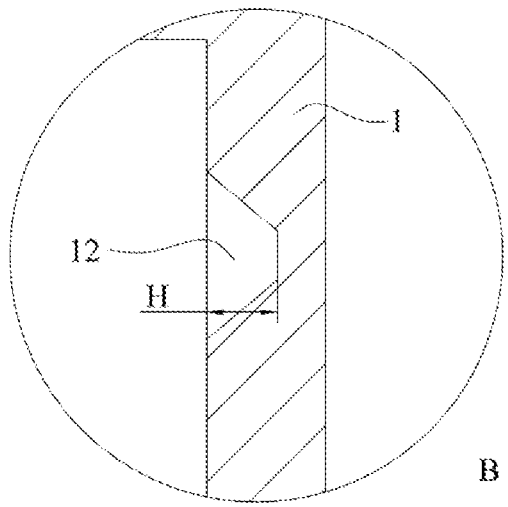
FIG. 5 is an enlarged view at the point B of FIG. 4.
Figure 6:
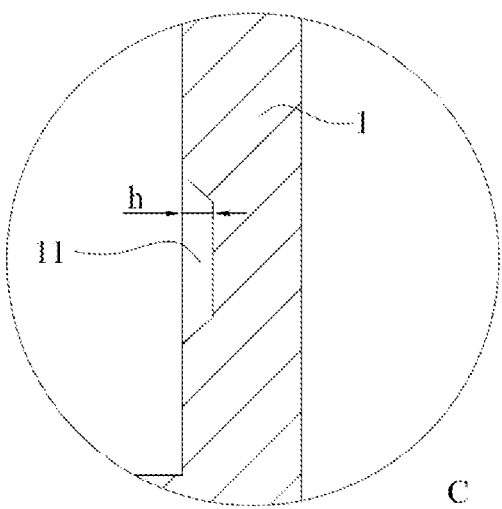
FIG. 6 is an enlarged view at the point C of FIG. 4.
Figure 7:
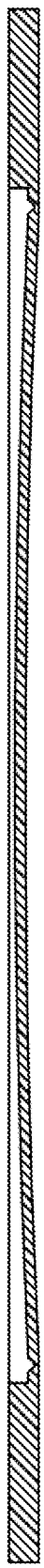
FIG. 7 is a sectional view of another structure of A-A of FIG. 3 provided by an embodiment.

In this embodiment, FIG. 4 is a sectional view of A-A of FIG. 3, and a bottom of the battery cover is a flat surface. In other embodiments, the sectional view along line A-A of FIG. 3 may also be the structure shown in FIG. 7, and the bottom of the battery cover is a cambered surface. The bottom refers to the right side surface in FIGS. 4 and 7.

The embodiment further discloses a battery. The battery includes the battery cover described above. The notch depth of the battery vent of the battery cover is enhanced. The stability of the air pressure threshold value is ensured. The safety of the battery cover is improved. Therefore, the safety of the battery is improved.

What is claimed is:

1. A method for manufacturing a vent structure, wherein the vent structure comprises a vent, and the method comprises:
   providing, with a first depth, a first notch having no intersection on a surface of the vent; and
   providing a second notch having a second depth on part of the first notch in a direction of the first depth, wherein the direction of the first depth is a direction perpendicular to the surface of the vent, a shape of the first notch is oval, the second notch is located at an arc portion of the first notch and a part of a straight-line portion of the first notch, the second notch covers the part of a straight-line portion of the first notch in the direction of the first depth, another part of the straight-line portion of the first notch is not covered by the second notch in the direction of the first depth, and the first notch is punched first with a puncher pin and then the second notch is punched with a puncher pin.

2. The method for manufacturing the vent structure of claim 1, wherein the second depth is greater than the first depth.

3. The method for manufacturing the vent structure of claim 1, wherein the first notch is a closed line.

4. The method for manufacturing the vent structure of claim 1, wherein a depth difference between the second depth and the first depth is 0.05 mm to 0.15 mm.

5. A battery vent structure, wherein the battery vent structure is manufactured by the method for manufacturing the vent structure of claim 1, the battery vent structure comprises the vent, and the vent is configured to fracture from the second notch when an internal air pressure of a battery exceeds a threshold.

6. A battery cover, comprising:
   a cover body and the battery vent structure of claim 5 disposed on the cover body.

7. The battery cover of claim 6, further comprising: a vent protective film disposed at an outer side of the vent.

8. The battery cover of claim 6, further comprising: a positive terminal and a negative terminal disposed on the cover body, wherein the cover body is a metal plate, the positive terminal is conductively fixed to the cover body, and the negative terminal is fixed to the cover body and is insulated from the cover body.

9. The battery cover of claim 8, wherein the negative pole is a copper-aluminum compound terminal, a top of the copper-aluminum compound terminal is an aluminum material end, and a bottom of the copper-aluminum compound terminal is a copper material end.

10. The battery cover of claim 6, wherein the vent of the battery vent structure is integrally punched or welded with the cover body.

11. A battery, comprising a battery cover of claim 6.

12. A battery vent structure, wherein the battery vent structure is manufactured by the method for manufacturing the vent structure of claim 2, the battery vent structure comprises the vent, and the vent is configured to fracture from the second notch when an internal air pressure of a battery exceeds a threshold.

\* \* \* \* \*